(12) United States Patent
Legier-Desgranges et al.

(10) Patent No.: US 12,415,485 B2
(45) Date of Patent: Sep. 16, 2025

(54) DRIVING ASSISTANCE SYSTEM AND METHOD

(71) Applicant: KUBOTA CORPORATION, Osaka (JP)

(72) Inventors: Thierry Legier-Desgranges, Crépy-en-Valois (FR); Amadou Sow, Crépy-en-Valois (FR)

(*) Notice: Subject to any disclaimer, the term of this patent is extended or adjusted under 35 U.S.C. 154(b) by 407 days.

(21) Appl. No.: 18/111,030

(22) Filed: Feb. 17, 2023

(65) Prior Publication Data
US 2023/0286475 A1 Sep. 14, 2023

(30) Foreign Application Priority Data

Mar. 10, 2022 (EP) .................... 22305270

(51) Int. Cl.
B60T 7/12 (2006.01)
F16D 48/06 (2006.01)

(52) U.S. Cl.
CPC ............... *B60T 7/12* (2013.01); *F16D 48/06* (2013.01); *B60T 2201/06* (2013.01); *B60T 2210/20* (2013.01); *B60T 2260/09* (2013.01); *F16D 2500/10412* (2013.01); *F16D 2500/3108* (2013.01); *F16D 2500/3124* (2013.01); *F16D 2500/50825* (2013.01)

(58) Field of Classification Search
None
See application file for complete search history.

(56) References Cited

U.S. PATENT DOCUMENTS

| | | | | |
|---|---|---|---|---|
| 6,439,675 B1* | 8/2002 | Zechmann | ............ | B60T 13/683 303/191 |
| 7,032,697 B2* | 4/2006 | Lee | ................. | B60W 30/18027 477/4 |
| 7,074,161 B2* | 7/2006 | Diebold | ................ | B60W 10/06 477/184 |
| 7,136,735 B2* | 11/2006 | Carlson | ................... | F16H 61/20 477/50 |
| 7,206,682 B2* | 4/2007 | Bodin | ..................... | F16D 48/08 701/87 |
| 7,226,389 B2* | 6/2007 | Steen | ............... | B60W 30/18118 477/901 |
| 7,399,040 B2* | 7/2008 | Schmidt | ................. | B60T 7/122 303/191 |
| 7,401,872 B2* | 7/2008 | Kinder | .................. | B60T 11/103 303/191 |
| 7,401,873 B2* | 7/2008 | Werner | ................... | B60T 7/122 303/191 |
| 7,419,455 B2* | 9/2008 | Hardtle | .................. | B60T 1/062 477/93 |
| 7,494,443 B2* | 2/2009 | Kamikado | .............. | B60T 7/122 477/194 |

(Continued)

FOREIGN PATENT DOCUMENTS

EP 3470707 A1 4/2019

*Primary Examiner* — Jonathan M Dager

(57) ABSTRACT

A driving assistance system for a work vehicle may comprise a service brake configured to decelerate the work vehicle upon actuation of the service brake, a parking brake and a transmission including a clutch. A controller may be configured to disengage the clutch when the work vehicle speed is less than a speed threshold and when the service brake is actuated, whereby the work vehicle is brought to a stop.

20 Claims, 2 Drawing Sheets

(56) References Cited

U.S. PATENT DOCUMENTS

| | | | | |
|---|---|---|---|---|
| 7,630,814 B2* | 12/2009 | Goss | | B60T 7/107 701/70 |
| 8,016,720 B2* | 9/2011 | Sokoll | | B60T 13/662 303/1 |
| 8,078,378 B2* | 12/2011 | Bradley, IV | | B60T 8/1708 477/195 |
| 8,224,548 B2* | 7/2012 | Ludwig | | B60W 30/18118 701/79 |
| 8,352,126 B2* | 1/2013 | Blaise | | B60W 30/18118 70/45 |
| 8,463,517 B2* | 6/2013 | De Rinaldis | | F16D 48/08 701/67 |
| 8,543,303 B2* | 9/2013 | Marcus | | G16Z 99/00 701/58 |
| 8,556,776 B2* | 10/2013 | Mair | | B60T 13/662 477/184 |
| 8,825,329 B2* | 9/2014 | Attallah | | B60T 8/172 701/70 |
| 9,020,725 B2* | 4/2015 | Sokoll | | B60T 7/122 172/219 |
| 9,193,338 B2* | 11/2015 | Schaefers | | B60T 8/4818 |
| 9,206,562 B2* | 12/2015 | Frelich | | E01C 19/48 |
| 9,821,778 B2* | 11/2017 | Frijas | | B60T 8/245 |
| 10,316,959 B2* | 6/2019 | Kuros | | F16H 61/0204 |
| 11,623,619 B2* | 4/2023 | Hutchins | | B60T 7/122 701/70 |
| 11,780,439 B2* | 10/2023 | Nemoto | | B60W 10/182 701/70 |
| 2004/0226768 A1* | 11/2004 | DeLuca | | B60T 17/221 180/275 |
| 2005/0246081 A1* | 11/2005 | Bonnet | | B60T 7/122 280/5.502 |
| 2006/0106520 A1* | 5/2006 | Bodin | | B60T 7/122 701/67 |
| 2007/0270281 A1* | 11/2007 | Inoue | | B60W 30/18118 477/180 |
| 2007/0299581 A1* | 12/2007 | Torralbo | | B60T 7/122 701/41 |
| 2010/0094513 A1* | 4/2010 | Mair | | B60W 10/02 701/48 |
| 2010/0138129 A1* | 6/2010 | Mallet | | B60T 7/122 701/83 |
| 2010/0262329 A1* | 10/2010 | Monti | | B60T 7/122 701/31.4 |
| 2013/0184954 A1* | 7/2013 | Treppenhauer | | B60T 8/32 701/70 |
| 2013/0237373 A1* | 9/2013 | Kaneko | | B60W 10/02 477/172 |
| 2014/0012471 A1* | 1/2014 | Nakaso | | B60W 30/18054 701/99 |
| 2016/0167663 A1* | 6/2016 | Sutton | | B60W 50/082 701/53 |
| 2017/0219092 A1* | 8/2017 | Kuros | | F16H 61/0204 |
| 2018/0237016 A1* | 8/2018 | Khafagy | | B61H 1/00 |
| 2019/0039577 A1* | 2/2019 | Nishimura | | F16H 63/50 |
| 2020/0393041 A1* | 12/2020 | Kuroshita | | B60T 7/14 |
| 2021/0380084 A1* | 12/2021 | Dowling | | B60T 8/171 |
| 2022/0196147 A1* | 6/2022 | Gono | | F16H 47/04 |

* cited by examiner

DRIVING ASSISTANCE SYSTEM AND METHOD

CROSS-REFERENCE TO RELATED APPLICATIONS

This application claims priority to European Patent Application No. EP22305270 filed on Mar. 10, 2022.

TECHNICAL FIELD

The present disclosure relates to the field of driving assistance, and more particularly to a driving assistance system for a work vehicle such as a tractor.

BACKGROUND

Work vehicles should meet safety and productivity requirements in all the tasks to which they are assigned. For instance, when a work vehicle is stopped on a slope, it should be able to resume moving in a simple and reliable manner. This includes, among others, reducing or even preventing rollback.

In this perspective, hill start assistance systems have been proposed, such as in U.S. Pat. No. 10,316,959 to Pawel Kuros. However, these systems often require sophistications of the components of the work vehicle, which may make them complex and expensive.

SUMMARY

The object of the present invention is to at least substantially remedy the above-mentioned drawbacks.

A driving assistance system for a work vehicle may comprise a service brake configured to decelerate the work vehicle upon actuation of the service brake, a parking brake and a transmission including a clutch. A controller may be configured to disengage the clutch when the work vehicle speed is less than a speed threshold and when the service brake is actuated, whereby the work vehicle is brought to a stop. In embodiments, the driving assistance system may obtain a slope value representative of the slope of a surface on which the work vehicle has stopped and may automatically activate the parking brake when the clutch has been disengaged and the slope value is greater than a slope threshold. The driving assistance system may reengage the clutch when the service brake is released, while maintaining the parking brake activated. The parking brake may be automatically deactivated when a predetermined delay after release of the service brake has elapsed. The predetermined delay may be greater than the time required to reengage the clutch, or when reengagement of the clutch has reached a predetermined value.

The work vehicle may be an agricultural vehicle or a construction vehicle, such as a tractor, a mower or the like (a groundcare vehicle), a telehandler, etc.

A work vehicle comprises a service brake, which may be actuated by a driver of the work vehicle and is configured, upon actuation, to decelerate the work vehicle, i.e. to decrease its speed with respect to the ground. Eventually, the work vehicle may come to a complete stop, in which case a continued actuation of the service brake would keep the vehicle stationary.

In contrast, the parking brake is configured to maintain the vehicle stopped without a continued actuation thereof. For instance, the parking brake may be configured to be switched between an activated position and a deactivated position, and able to be left in the activated position without further actuation thereof, as opposed to the service brake which is released as soon as actuation thereof is released. Besides, the parking brake may not be able to decelerate the vehicle.

A service brake and a parking brake are each known per se in the art and both are conventionally provided on vehicles. The parking brake is configured to be automatically activated and deactivated, and thus may be referred to as an assisted parking brake or an automatic parking brake.

The vehicle has a transmission: torque between the driving power source (e.g. engine, electric motor or the like) and the wheels is transmitted through the transmission. A clutch is to be disengaged when the driver wants to change the shift, and then reengaged.

As mentioned above, the controller is configured to disengage the clutch when the work vehicle speed is less than a speed threshold and the service brake is actuated. Disengaging the clutch when speed gets low is usual in vehicles in order to prevent stalling, but is generally performed by pressing a dedicated pedal. In contrast, in the above driving assistance system, the controller disengages the clutch irrespective of whether the driver actuates the clutch pedal. Therefore, the vehicle may be stopped by operating only the service brake actuator. Likewise, the controller is configured to reengage the clutch when the service brake is released, so that the driver may resume moving the vehicle by operating only the service brake actuator. Thus stopping and restarting of the work vehicle are facilitated.

In order to prevent rollback on slopes, the controller is configured to detect a slope situation, or more precisely to obtain a slope value representative of the slope of a surface on which the vehicle has stopped. The slope value may indicate directly the slope as an angle, or may be expressed in another unit which, after a calibration known per se, would represent the slope.

If the slope is greater than a slope threshold, i.e. if there is a risk of rollback, the parking brake is automatically activated, and is automatically deactivated after the driver has released the service brake actuator, specifically when a predetermined delay after release of the service brake has elapsed, the predetermined delay being greater than the time required to reengage the clutch, or when reengagement of the clutch has reached a predetermined value. Reengagement of the clutch measures the ability of the clutch to transmit torque between an input and an output thereof.

Therefore, although the service brake has been released, the parking brake is maintained until the clutch has been reengaged at least to a certain value, which is calibrated as desired to counter the tendency of the work vehicle to rollback.

As a consequence, the driving assistance system judiciously couples operation of the service brake, the clutch and the parking brake in order to enable the driver to safely drive the work vehicle, with limited or no uncontrolled movements, while operating the work vehicle in a simple manner (in this case, using only the service brake actuator) and while relying on existing components of the work vehicle, such as classical service brake, clutch and parking brake, thus limiting the cost and complexity increase.

In the present disclosure, although the example of rollback is given, this notion may be generalized to encompass any movement of the work vehicle in the direction of the slope and possibly contrary to the desired driving direction, or more generally to any uncontrolled movement of the work vehicle due to gravity.

Optionally, the controller is configured to determine the slope value based on a stroke of a service brake actuator or on a pressure within the service brake. In these embodiments, a dedicated slope sensor is not needed, so that complexity and cost of the work vehicle is not increased. The stroke of the service brake actuator or a pressure within the service brake (e.g. a hydraulic pressure when the service brake includes a hydraulic mechanism) are representative of the driver's force necessary to bring the work vehicle to a stop on that slope and to maintain the work vehicle stopped. The greater the slope, the greater the stroke or pressure.

Optionally, the work vehicle further comprises an angle sensor configured to output information representative of an angle of the work vehicle with respect to horizontal, and wherein the controller is configured to determine the slope value based on an output of the angle sensor. In these embodiments, the angle sensor may provide a more accurate measure of the slope, and possibly an indication of the direction of the slope (e.g. forwards or backwards). The angle sensor may be used alone or as a complement to the above-mentioned stroke or pressure.

Optionally, the controller is configured to determine that the service brake has been released based on a stroke of a service brake actuator or on a pressure within the service brake. For instance, the controller may determine that the service brake has been released when the stroke or pressure is less than a threshold.

Optionally, the predetermined value is a value of a pressure within an engagement mechanism of the clutch. The predetermined value is the threshold at which the parking brake is deactivated. For instance, if the engagement mechanism of the clutch includes hydraulic components, the pressure may be the hydraulic pressure.

Optionally, the driving assistance system further comprises an input device configured to enable a user to input settings for the controller. The input device may comprise a button, a lever, a switch, a touch panel, a communication device configured to connect to an external terminal, etc.

Optionally, the input device is configured to enable a user to turn on/off said automatic activation and deactivation of the parking brake. Therefore, the user (or driver) may turn on the automatic activation/deactivation of the parking brake when the vehicle is driven on a sloped ground, and may turn off said automatic activation/deactivation when the driver does not need it, for instance when the vehicle is driven on roads and the driver may suddenly brake without being on a slope, or when the vehicle is driven with a loader. In the latter case, the driver may look for reactivity despite frequent brake actuations; thus, in these circumstances, automatically activating the parking brake may not be suitable. Therefore, the driving assistance system is able to adapt to all driving situations.

Optionally, the input device is configured to enable a user to calibrate the slope threshold. The slope threshold is the value from which the parking brake is activated when the vehicle is stopped. Therefore, the user may adapt the automatic behavior of the work vehicle to his needs and driving habits.

Optionally, the input device is configured to set the slope threshold at a value chosen by the user within a list of preset values. Therefore, calibration is easy and corresponds to safe and standard settings.

Optionally, alternatively or in addition, the input device is configured to record, as the slope threshold, a value corresponding to an actuation of a service brake actuator. In particular, when the slope value is determined based on the stroke of a service brake actuator or on a pressure within the service brake, the driver may calibrate the slope threshold by calibrating directly the detected quantity, e.g. the stroke or the pressure respectively. By actuating the service brake actuator to the desired threshold, the service brake actuator is set to a given stroke, and a pressure within the service brake is set to a given value, and the stroke and/or the pressure value may be recorded to identify the desired slope threshold. Therefore, the driving assistance system is highly configurable and the settings may optionally be input in a plurality of manners.

All in all, the driving assistance system not only enables the driver to safely drive the work vehicle in a simple and inexpensive manner, but also provides the work vehicle with much versatility and flexibility, such that every driver may perform the desired working tasks, depending on the work implement used, as per his best convenience.

The present disclosure is further related to a driving assistance method for a work vehicle comprising a service brake configured to decelerate the work vehicle upon actuation of the service brake, a parking brake and a transmission including a clutch, the driving assistance method comprising: disengaging the clutch when the work vehicle speed is less than a speed threshold and the service brake is actuated, whereby the work vehicle is brought to a stop; obtaining a slope value representative of the slope of a surface on which the work vehicle has stopped; automatically activating the parking brake when the clutch has been disengaged and the slope value is greater than a slope threshold; reengaging the clutch when the service brake is released, while maintaining the parking brake activated; and automatically deactivating the parking brake when a predetermined delay after release of the service brake has elapsed, the predetermined delay being greater than the time required to reengage the clutch, or when reengagement of the clutch has reached a predetermined value.

The driving assistance method may be carried out by the above-described driving assistance system, and may further include further steps corresponding to some or all of the above-described optional features.

The present disclosure is further related to a computer program including instructions for executing the steps of the above described driving assistance method when said program is executed by a computer. This program may use any programming language and take the form of source code, object code or a code intermediate between source code and object code, such as a partially compiled form, or any other desirable form.

The present disclosure is further related to a recording medium readable by a computer and having recorded thereon a computer program including instructions for executing the steps of the above described driving assistance method. The recording medium may be any entity or device capable of storing the program. For example, the medium may include storage means such as a ROM, for example a CD ROM or a microelectronic circuit ROM, or magnetic storage means, for example a diskette (floppy disk) or a hard disk.

Alternatively, the recording medium may be an integrated circuit in which the program is incorporated, the circuit being adapted to execute the method in question or to be used in its execution.

BRIEF DESCRIPTION OF THE DRAWINGS

The invention and advantages thereof will be better understood upon reading the detailed description which follows, of embodiments given as non-limiting examples. This description refers to the appended drawings, wherein.

DETAILED DESCRIPTION OF EMBODIMENTS

Figure 1:
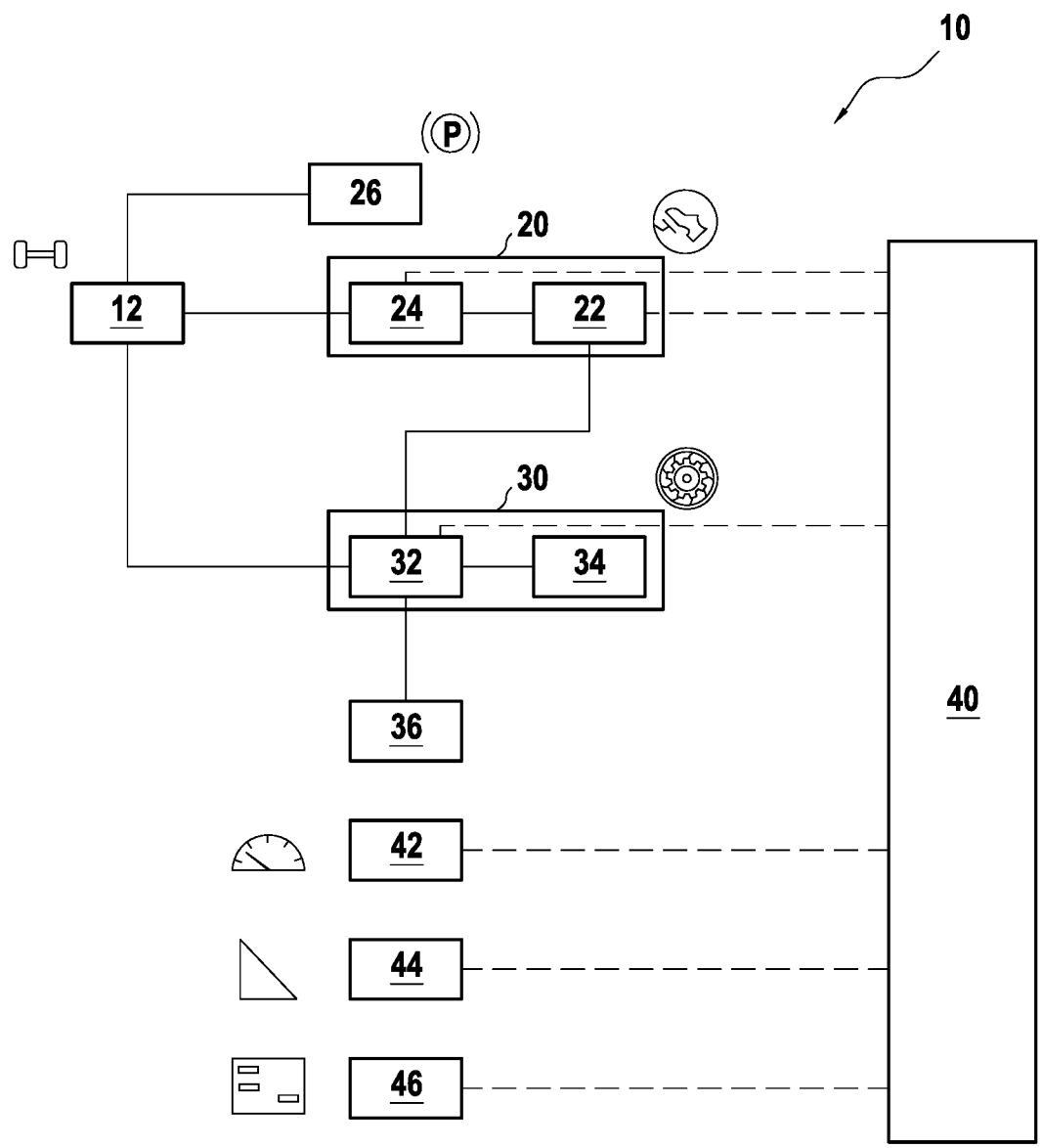
FIG. 1 is a diagram illustrating a work vehicle according to an embodiment.

A work vehicle 10 is diagrammatically illustrated in FIG. 1. Systems of the work vehicle 10 which are not relevant to the present disclosure are omitted and may be provided as known in the art. For instance, as a work vehicle, the work vehicle 10 may comprise a work implement, a trailer, etc.

The work vehicle 10 comprises wheels 12, generally two front wheels and two rear wheels. More or less wheels may be provided.

The work vehicle 10 comprises a service brake 20. The service brake 20 is configured to decelerate the work vehicle 10 upon actuation. To this end, the service brake 20 may comprise a service brake actuator 22 and a service brake mechanism 24. The service brake actuator 22 is actuable by a driver of the work vehicle 10. The service brake mechanism 24 receives an input from the service brake actuator 22 and acts on the wheels 12 (or an axle, or a shaft connected to the wheels 12) accordingly to decelerate the work vehicle 10. The service brake 20 itself may be implemented as known per se in the art. For instance, the service brake actuator 22 may comprise a pedal. For instance, the service brake mechanism 24 may comprise a hydraulic system.

The work vehicle 10 further comprises a parking brake 26 distinct from the service brake 20. The parking brake 26 is configured, when activated, to keep the work vehicle 10 stopped, irrespective of the actuation of any other system of the work vehicle 10. The parking brake 26 is actuable by a user of the work vehicle 10. The parking brake 26 itself may be implemented as known per se in the art.

The work vehicle 10 further comprises a driving power source 36 such as an engine, an electric motor or the like. The driving power source 36 may include one or several engines, electric motors or the like, or a combination thereof. The work vehicle 10 is provided with a transmission 28, such as a power shift transmission, configured to transmit torque from the driving power source 36 to the wheels 12. The power shift transmission, as opposed to a continuous variable transmission, enables the user to select a shift among a plurality of discrete shifts, which may be implemented by corresponding gears, as known per se in the art.

In particular, the transmission 28 includes a clutch 30. The clutch 30 may comprise an engagement mechanism 32, configured to engage or disengage an input component connected to the driving power source 36 to/from an output component connected to the wheels 12. When the clutch 30 is engaged (or closed), torque is transmitted from the driving power source 36 to the wheels 12 via the transmission 28. Conversely, when the clutch 30 is disengaged (or open), torque from the driving power source 36 is not transmitted to the wheels 12 via the transmission 28.

The clutch 30 may comprise a clutch actuator 34, actuable by a user of the work vehicle 10, and configured to transmit an engagement or disengagement signal to the engagement mechanism 32. For instance, the clutch actuator 34 may be a clutch pedal.

The work vehicle 10 is provided with a driving assistance system which comprises a controller 40. The controller 40 may be a dedicated controller or may be common to other systems of the work vehicle 10.

As illustrated in FIG. 1, the controller 40 may be connected to the service brake actuator 22. For instance, the controller 40 may be configured to receive a value indicative of the stroke of the service brake actuator 22. Based on that stroke, the controller 40 may be configured to determine a slope on which the work vehicle 10 is stopped: for instance, the driver needs to apply a relatively great force to the service brake actuator 22, hence to move it along a relatively great stroke, in order to maintain the work vehicle 10 stopped on a steep slope. Conversely, the driver needs to apply only a relatively small force to the service actuator 22, hence to move it along a relatively short stroke, in order to maintain the work vehicle 10 stopped on a gentle slope.

As illustrated in FIG. 1, the controller 40 may be connected to the service brake mechanism 24. For instance, the controller 40 may be configured to receive a value indicative of the pressure within the service brake 20, in particular, within the service brake mechanism 24 or at an interface between the service brake mechanism 24 and the service brake actuator 22. Based on that pressure, the controller 40 may be configured to determine a slope on which the work vehicle 10 is stopped: for instance, the driver needs a relatively high braking force of the service brake mechanism 24, hence a relatively high pressure within the service brake 20, in order to maintain the work vehicle 10 stopped on a steep slope. Conversely, the driver needs a relatively low braking force of the service brake mechanism 24, hence a relatively low pressure within the service brake 20, in order to maintain the work vehicle 10 stopped on a gentle slope.

The connection between the controller 40 and at least one of the service brake actuator 22 and the service brake mechanism 24 allows inter alia the controller to determine a slope value, i.e. a value representative of the slope of a surface on which the vehicle has stopped. Based on the same principles, the controller 40 may be configured to determine that the service brake 20 has been released based on a stroke of the service brake actuator 22 and/or on a pressure within the service brake 20.

The controller 40 may be connected to the parking brake 26. The controller 40 may be configured to automatically activate or deactivate the parking brake 26 under certain circumstances, as will be detailed hereinafter. Besides, for instance, the controller 40 may be configured to automatically activate the parking brake 26 when the driver leaves his seat.

The controller 40 may be connected to the clutch 30, in particular to the engagement mechanism 32. The controller 40 is configured to automatically engage or disengage the clutch 30 under certain circumstances, as will be detailed hereinafter. Note that, in this embodiment, the connection between the controller 40 and the engagement mechanism 32 bypasses the clutch actuator 34: thus, when engagement or disengagement of the clutch 30 is managed by the controller 40, no operation of the clutch actuator 34 may be required, which facilitates operation of the work vehicle 10 for the driver.

The work vehicle 10 may comprise a speed sensor 42, configured to determine a speed of the work vehicle 10. Direct and indirect speed sensors are known in the art. The speed sensor 42 may be configured to output the speed of the work vehicle 10 or to output a comparison result between the speed of the work vehicle 10 and one or more given values, e.g. thresholds. The controller 40 may be connected to the speed sensor 42 in order to determine whether a speed of the work vehicle 10 is less than a speed threshold. For instance, the speed threshold may be less than 5 kilometers per hour (kph), preferably less than 2 kph, preferably less than 1 kph.

The work vehicle 10 may comprise an angle sensor 44 configured to output information representative of an angle of the work vehicle with respect to horizontal. Angle sensors for vehicles are known per se in the art. As indicated above, the slope value may be determined by the controller 40 through an output of any one of the service brake actuator 22, the service brake mechanism 24 and the slope sensor 44, or a combination thereof in order to make the determination more accurate and/or reliable.

The work vehicle 10 may comprise an input device 46 for a user to input settings for the controller 40. Although the input device 46 is diagrammatically illustrated as a touch panel, the input device 46 may be any other means enabling the user to tune settings of the controller 40, as mentioned above. Preferably, the input device 46 is such that it is accessible to a standard user or driver of the work vehicle 10, and not only to shops or dealers.

In this embodiment, the controller 40 has the hardware configuration of a computer: it comprises inter alia a processor, a memory and communications means with the other devices to which it is connected, as described above and enabling the controller 40 to acquire values to these devices. The memory forms a recording medium which may be read by the processor and on which a computer program is stored, the computer program comprising instructions for carrying out the driving assistance method 100 which will be described with reference to FIG. 2.

Figure 2:
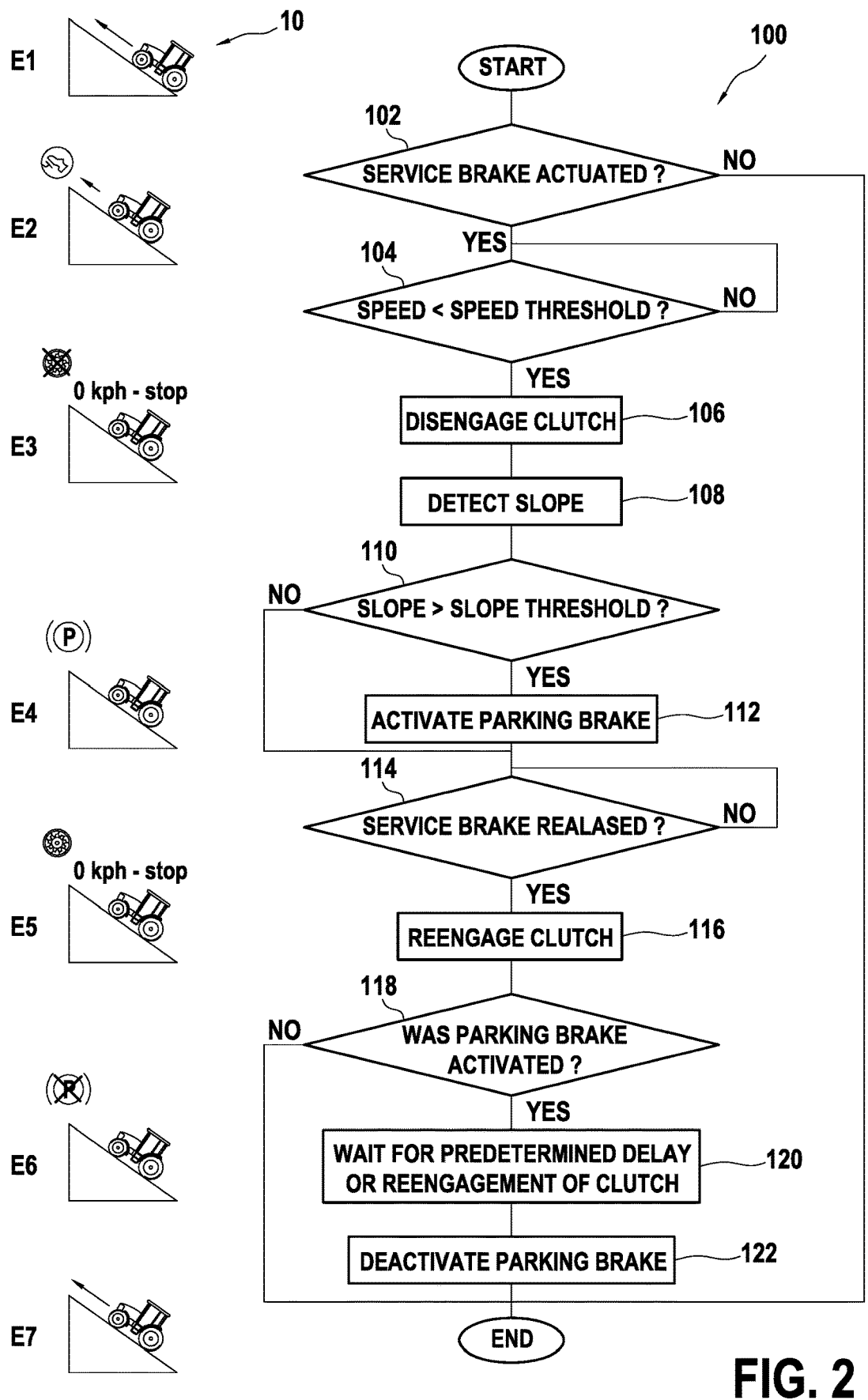
FIG. 2 is a flowchart illustrating a driving assistance method according to an embodiment.

FIG. 2 is a flowchart illustrating the driving assistance method 100 (hereinafter "the method") according to an embodiment. As shown in frame E1 of FIG. 2, as an initial situation, it is assumed that the work vehicle 10 is driving on an upward slope and that the driver wants to stop on that slope. The driving assistance method 100 is to be applied in real time, repeatedly during operation of the work vehicle 10.

At step 102, the method evaluates whether the service brake 20 has been actuated. If the service brake 20 has not been actuated (NO), the method terminates. Conversely, if the service brake 20 has been actuated (YES), it should result in a speed decrease of the work vehicle 10 as shown in frame E2, and the method proceeds to step 104.

At step 104, the method determines whether the work vehicle speed is less than a speed threshold. This determination may be carried out by the controller 40, e.g. based on the output of the speed sensor 42. If the work vehicle speed is greater than the threshold (NO), the method repeats step 104, as the work vehicle 10 is still moving too quickly to stop. In other words, the method waits for the work vehicle 10 to be close to stopping, or to be stopped altogether. When the work vehicle 10 has stopped or is nearly stopped, for example, when the work vehicle speed is less than the speed threshold (YES), the method proceeds to step 106.

At step 106, since the work vehicle speed is less than a speed threshold and the service brake is actuated, the controller 40 disengages the clutch 30. Under these circumstances, the work vehicle 10 is brought to a stop. This situation is illustrated in frame E3. Then, the method proceeds to step 108.

At step 108, the controller 40 obtains a slope value representative of the slope of a surface on which the work vehicle 10 has stopped. The slope value may be obtained by the controller as discussed above. Since the ways for obtaining the slope value are independent of the clutch 30, the slope value may be obtained before disengaging the clutch at step 106, simultaneously thereto, or afterwards as illustrated.

After obtaining the slope value, the controller 40 determines whether the slope value is greater than a slope threshold at step 110. If the slope value is greater than the slope threshold at step 110 (YES), the method proceeds to step 112. Otherwise (NO), the method proceeds directly to step 114.

When the clutch has been disengaged at step 106 and the slope value obtained at step 108 is greater than a slope threshold, as determined in step 110, the controller 40 automatically activates the parking brake 26 at step 112, as illustrated in frame E4. In other words, when the slope is steeper than the slope threshold, it is determined that the parking brake 26 will be helpful for the work vehicle 10 to resume moving, especially moving forward, and the parking brake 26 is automatically activated by the controller 40. The condition on the clutch 30 being disengaged ensures that the parking brake is not activated while the clutch 30 transmits torque from the driving power source 26 to the wheels 12, which is likely to lead to stalling.

Conversely, when the slope value is less than the slope threshold, i.e. the slope is relatively gentle, the controller 40 may not automatically activate the parking brake 26, because the parking brake 26 may not be required for the work vehicle 10 to resume moving, and may even slow down the operation of the work vehicle 10.

After activating the parking brake 26, or after determining that the slope value is less than the slope threshold, the method proceeds to step 114. At step 114, the method determines whether the service brake 20 has been released. That is, the method determines whether the driver wants the work vehicle 10 to resume moving. Service brake release detection may take place as described above. An arbitrary long time may elapse between steps 112 and 114, insofar as the parking brake 26 has been activated or the user keeps the service brake 20 actuated. As long as the service brake has not been released (NO at step 114), step 114 is repeated.

Otherwise, when the service brake has been released (YES at step 114), the clutch 30 is reengaged by the controller 40 at step 116, while maintaining the parking brake 26 activated. This is illustrated in frame E5.

Then, at step 118, the method checks whether the parking brake was activated. If the parking brake was not activated (NO), then the method terminates, as the work vehicle 10 is capable of moving as soon as the clutch 30 has been reengaged.

Otherwise, if the parking brake 26 was activated (YES), for instance at step 112, the controller 40 does not deactivate the parking brake immediately, but the method proceeds to step 120, in which the controller 40 waits for a predetermined delay after release of the service brake 20, the predetermined delay being greater than the time required to reengage the clutch 30, or waits for reengagement of the clutch 30 to reach a predetermined value.

For instance, said predetermined value represents a degree of reengagement of the clutch 30, as reengagement is a continuous process between two extreme states, namely the clutch 30 being fully engaged and the clutch 30 being fully disengaged. For example, if the engagement mechanism 32 of the clutch 30 includes hydraulic components or the like, the predetermined value may be a value of a pressure within the engagement mechanism 32.

The predetermined delay may be tuned to be long enough to enable reengagement of the clutch 30, but short enough in order to prevent stalling of the work vehicle 10. The starting point of the predetermined delay is the release of the service brake 20, e.g. when the service brake actuator 22 is released up to a certain level (i.e. the stroke of the service brake actuator 22 reaches a threshold), or when a pressure within the service brake 20 reaches a threshold. In a variant, the starting point of the predetermined delay may be when the reengagement of the clutch 30 reaches a predetermined value.

Either the predetermined delay or the predetermined value may be constant or variable as a function of other parameters, such as the slope value, the parking brake oil temperature where applicable, etc.

When the predetermined delay after release of the service brake 20 has elapsed, or when reengagement of the clutch 30 has reached the predetermined value, the driving assistance method proceeds to step 122, in which the controller 40 deactivates the parking brake 26. This situation is illustrated by frame E6. Afterwards, the driving assistance method 100 terminates, as the work vehicle 10 is able to resume moving with a limited or no rollback, as shown in frame E7.

Although the driving assistance method 100 has been described with reference to the controller 40 and the embodiment of the work vehicle 10 as detailed in FIG. 1, the driving assistance method is not limited to that embodiment and may be carried out by other means.

In some embodiments, the input device 46 enables the user to turn on/off said automatic activation and deactivation of the parking brake 26. To this end, the input device 46 may include a physical switch or the like, or a virtual switch which may be operated by the touch panel or another control present in the work vehicle (joystick, etc.).

FIG. 2 represents a case in which the automatic activation and deactivation of the parking brake 26 is turned on. When it is turned off, the controller 40 may ignore steps 110 and 112 so that the parking brake 26 is not automatically activated, irrespective of the slope value. Step 118 may be ignored or may be carried out, but since the parking brake was not activated (NO in step 118), the deactivation thereof is not necessary, and steps 120 and 122 are not carried out in either case.

Step 110 relies on a comparison with a slope threshold. In some embodiments, the slope threshold may be constant, e.g. set by the manufacturer. In other embodiments, the user may be able to calibrate the slope threshold, e.g. through the input device.

For instance, the input device 46 may give the user options within a list of preset values (e.g. light, medium and hard sensitivity). The values may themselves be constant, e.g. set by the manufacturer. Thus, the user may select the slope threshold which is the best adapted to his way of driving the work vehicle 10 and to his operational needs.

In another example, the slope threshold may be selected not among discrete values but within a continuous range, for a more accurate calibration. The desired slope threshold may be input manually into the input device 46. However, the input device 46 may otherwise be configured to record, as the slope threshold, a value corresponding to an actuation of the service brake actuator 22. As detailed above, a value corresponding to an actuation of the service brake actuator 22 may be a stroke value or a pressure value and is representative of a slope.

Thus, for example, the user may perform a calibration operation of the slope threshold by starting a calibration phase on the input device 46, actuating the service brake actuator 22 to a desired level (e.g. stroke or pressure), and to make the input device 46 record the value at which the service brake actuator 22 is being actuated. Optionally, the input device 46, e.g. in case of a touch panel, or another device, may display the recorded value, or even the current value to which the service brake actuator 22 is being actuated, to facilitate calibration.

Although the present disclosure refers to specific exemplary embodiments, modifications may be provided to these examples without departing from the general scope of the invention as defined by the claims. For instance, although FIG. 1 illustrates some connections between the different components, the actual connections may be carried out in a different way in order to yield the same functions. As another example, although FIG. 2 presents steps of the driving assistance method in a certain order, the skilled person may modify this order in a technically appropriate manner while still carrying out the relevant steps of the method. More generally, individual characteristics of the different illustrated/mentioned embodiments may be combined in additional embodiments. Therefore, the description and the drawings should be considered in an illustrative rather than in a restrictive sense.

The invention claimed is:

1. A driving assistance system for a work vehicle comprising a service brake configured to decelerate the work vehicle upon actuation of the service brake, a parking brake and a transmission including a clutch, the driving assistance system comprising a controller configured to:
   disengage the clutch when the work vehicle speed is less than a speed threshold and the service brake is actuated, whereby the work vehicle is brought to a stop;
   obtain a slope value representative of a slope of a surface on which the work vehicle has stopped;
   automatically activate the parking brake when the clutch has been disengaged and the slope value is greater than a slope threshold;
   reengage the clutch when the service brake is released, while maintaining the parking brake activated; and
   automatically deactivate the parking brake when a predetermined delay after release of the service brake has elapsed, the predetermined delay being greater than the time required to reengage the clutch, or when reengagement of the clutch has reached a predetermined value.

2. The driving assistance system of claim 1, wherein the controller is configured to determine the slope value based on a stroke of a service brake actuator or on a pressure within the service brake.

3. The driving assistance system of claim 1, wherein the work vehicle further comprises an angle sensor configured to output information representative of an angle of the work vehicle with respect to horizontal, wherein the controller is configured to determine the slope value based on an output of the angle sensor.

4. The driving assistance system of claim 1, wherein the controller is configured to determine that the service brake has been released based on a stroke of a service brake actuator or on a pressure within the service brake.

5. The driving assistance system of claim 1, wherein the predetermined value is a value of a pressure within an engagement mechanism of the clutch.

6. The driving assistance system of claim 1, further comprising an input device configured to enable a user to input settings for the controller.

7. The driving assistance system of claim 6, wherein the input device is configured to enable a user to turn on/off said automatic activation and deactivation of the parking brake.

8. The driving assistance system of claim 6, wherein the input device is configured to enable a user to calibrate the slope threshold.

9. The driving assistance system of claim 8, wherein the input device is configured to set the slope threshold at a value within a list of preset values.

10. The driving assistance system of claim 8, wherein the input device is configured to record, as the slope threshold, a value corresponding to an actuation of a service brake actuator.

11. A driving assistance method for a work vehicle comprising a service brake configured to decelerate the work vehicle upon actuation of the service brake, a parking brake and a transmission including a clutch, the driving assistance method comprising:
- disengaging the clutch when the work vehicle speed is less than a speed threshold and the service brake is actuated, whereby the work vehicle is brought to a stop;
- obtaining a slope value representative of a slope of a surface on which the work vehicle has stopped;
- automatically activating the parking brake when the clutch has been disengaged and the slope value is greater than a slope threshold;
- reengaging the clutch when the service brake is released, while maintaining the parking brake activated; and
- automatically deactivating the parking brake when a predetermined delay after release of the service brake has elapsed, the predetermined delay being greater than the time required to reengage the clutch, or when reengagement of the clutch has reached a predetermined value.

12. The driving assistance method of claim 11, further comprising a computer program including instructions for executing the steps of the method of claim 11 when said program is executed by a computer.

13. The driving assistance method of claim 11, further comprising a recording medium readable by a computer and having recorded thereon a computer program including instructions for executing the steps of the method of claim 11.

14. The driving assistance method of claim 11, further comprising determining the slope value based on a stroke of a service brake actuator or on a pressure within the service brake.

15. The driving assistance method of claim 11, further comprising outputting information representative of an angle of the work vehicle with respect to horizontal, wherein the slope value is determined based on an output of the angle sensor.

16. The driving assistance method of claim 11, further comprising determining that the service brake has been released based on a stroke of a service brake actuator or on a pressure within the service brake.

17. The driving assistance method of claim 11, wherein the predetermined value is a value of a pressure within an engagement mechanism of the clutch.

18. The driving assistance method of claim 11, further comprising enabling a user to input settings for a controller controlling the driving assistance method.

19. The driving assistance method of claim 11, further comprising enabling a user to turn on/off automatic activation and deactivation of the parking brake.

20. The driving assistance system of claim 11, further comprising enabling a user to calibrate the slope threshold.

* * * * *